United States Patent [19]
Stuart

[11] 3,813,598
[45] May 28, 1974

[54] SINGLE TONE CARRIER RECOVERY SYSTEM

[75] Inventor: Richard L. Stuart, Beltsville, Md.

[73] Assignee: Rexon Electronics, Inc., Silver Spring, Md.

[22] Filed: Aug. 16, 1971

[21] Appl. No.: 172,090

[52] U.S. Cl. .................. 325/49, 325/60
[51] Int. Cl. .................. H04b 1/68
[58] Field of Search ......... 325/49, 50, 63, 138, 329, 325/418, 419, 420, 421, 65, 42, 60

[56] References Cited

UNITED STATES PATENTS

| | | | |
|---|---|---|---|
| 2,699,494 | 1/1955 | Albricht | 325/49 |
| 2,794,910 | 6/1957 | Arends | 325/329 |
| 2,871,295 | 1/1959 | Stachiewicz | 325/49 |
| 2,979,566 | 4/1961 | Hopner et al. | 325/50 |
| 3,289,082 | 11/1966 | Shumate | 325/60 |
| 3,311,828 | 3/1967 | Chasek | 325/50 |
| 3,462,687 | 8/1969 | Becker et al. | 325/50 |
| 3,566,036 | 2/1971 | Roche et al. | 325/50 |

*Primary Examiner*—Robert L. Richardson
*Assistant Examiner*—A. M. Psitos
*Attorney, Agent, or Firm*—Larson, Taylor & Hinds

[57] ABSTRACT

A data communication carrier recovery system wherein a single tone is added to the information spectrum to be transmitted to provide carrier recovery and "phase jitter" tracking. At the receiver, the transmitted spectrum is filtered to remove the tone prior to demodulation, demodulation being accomplished by multiplying the filtered signal by the recovered carrier to translate the spectrum back to baseband. The carrier is recovered by modulating the tone frequency by a subdivided recovered clock frequency. To provide jitter immunity the coherent carrier is made to exactly track the phase jitter by equalizing path delays so as to eliminate any variation in delay or phase between the recovered carrier and the carrier frequency present in the line signal. Three different carrier phase correction schemes are disclosed.

11 Claims, 7 Drawing Figures

SINGLE TONE CARRIER RECOVERY SYSTEM

FIELD OF THE INVENTION

The present invention relates to data communication systems and, more particularly, to carrier recovery and demodulation systems for data modems and other bandlimited signal transmission systems.

BACKGROUND OF THE INVENTION

Bandlimited signal transmission systems typically employ modulation or quantization methods for enhancing the quality of the transmitted signal or make the system more economical. In telephone systems these methods are generally employed in multiplex or "carrier" systems. Modulation or quantization methods generally cause changes in a number of characteristics of the band of interest thus resulting in impairment of the efficiency of the band for signal transmission. Even without the use of modulation or quantization methods the efficiency of a transmission link may be impaired by external signals. One of the impairments commonly experienced in signal transmission systems is known as "phase jitter," an impairment wherein the received signal is changed, or is changing, in phase or in frequency with respect to the phase or frequency of the transmitted signal. Such changes whether steady state or continuous, are introduced in the transmission medium, and are particularly deleterious to synchronous and other time-based sampling schemes used for signal reception. Although methods for overcoming frequency changes through adjustment of the recovered carrier in SSB and VSB systems have been used these methods suffer a number of disadvantages particularly insofar as accuracy is concerned.

Considering some of these methods, one fundamental approach involves the use of a 90 percent modulated, AM, vestigial sideband signal. By employing 90 percent modulation, a component of the carrier will always appear in the line spectrum and hence a minimum reference level for all data patterns is provided. This approach suffers a number of disadvantages perhaps the most serious of which is the 3db degradation of the signal to noise performance because of the additional carrier energy required.

A second approach involves the use of out of band tones. In one approach employing out of band tones a tone separation is used which is a multiple of the basic keying rate so as to permit recovery of the absolute clock frequency. The absolute carrier frequency is recovered by dividing the clock frequency to obtain the frequency difference between the upper tone and the real carrier frequency. Phase correction is accomplished by comparing the signals of interest with a recovered phase reference. Among the disadvantages of this approach are that the resulting line spectrum is quite wide, that the tones, after recovery, must still be phase corrected, and that the tones must be removed prior to actual signal detection to avoid their being "folded" into the recovered baseband signal by the demodulation process. A second approach employing out of band tones utilizes a data encoding operation which forces zeroes in the baseband spectrum at D.C. and the keying rate to provide convenient locations for pilot tones for recovery of both the carrier and clock references. Although this approach overcomes some of the problems involving tone recovery and broad dispersion of the transmitted spectrum, a significant decrease in the signal to noise performance still results. In addition to the energy necessary for the pilot tones, which is, of course, required for all tone type recovery systems, the decision distance is reduced as a result of the multi-level baseband signal now recovered, the clock margin is reduced as a result of the multi-level "eye" pattern having a narrower opening than a basic two level eye, the amplitude and delay distortion margins of the multi-level eye are reduced, and the phase jitter margins of the multi-level eye are reduced.

In addition to these various disadvantages, a further very important disadvantage of the carrier recovery systems of the prior art is that these systems do not provide "wide band" correction of phase perturbations such as phase jitter. However, rather than discuss the disadvantages of the prior art carrier recovery systems any further, it is felt that the advantages of the present invention as compared to such systems can be best appreciated by turning now to a consideration of the carrier recovery system of the present invention.

SUMMARY OF THE INVENTION

In accordance with the present invention a single tone carrier recovery system is provided which overcomes many of the disadvantages of the prior art as well as provides a number of important positive advantages. More specifically, the recovery system of the invention, because of the "relative" realtime tracking capability thereof as explained hereinbelow, provides immunity to phase perturbations in the media. Further, the system is characterized by fast recovery acquisition and efficient spectrum utilization. In addition adaptive carrier phase correction is provided and, in accordance with one carrier phase correction approach, first order delay correction is provided.

According to the invention, a data communication system is provided wherein a tone signal is added to the transmit spectrum of the transmitter of a carrier type system either above or below this spectrum. It should be noted that the present invention is applicable to modulation techniques such as single sideband, vestigial sideband and double sideband and that, further, the modulation can be bilevel or multilevel, biphase or multiphase, or a combination thereof. The tone is preferably produced by modulating a submultiple of the clock frequency with the carrier frequency and is then added to the carrier-modulated information spectrum to provide a composite line signal.

At the receiver, the tone is removed from the transmitted line spectrum prior to demodulation and demodulation is accomplished by multiplying the filtered information signal by the recovered carrier to thereby translate the spectrum back to the baseband. Carrier recovery involves both frequency acquistion and phase correction. The carrier frequency is recovered by reversing the process of tone placement used at the transmitter, that is, by separating out the modulated tone and modulating this signal with a tone frequency, produced by dividing the recovered clock frequency by the same factor used to produce the submultiple clock frequency at the transmitter, to produce the carrier frequency.

Any one of three different approaches is preferably used for providing carrier phase correction. In a first approach, use is made of a quadrature component of the carrier added to the transmitted spectrum. The received spectrum containing the quadrature carrier component is multiplied in a produce modulator by the real carrier to produce an output whose amplitude and phase is indicative of the phase error. This output is used to advance or retard the phase of the recovered carrier to drive the correlation between the carrier present in the line signal and the recovered carrier to zero.

The second approach utilizes the information contained in the controls for the taps adjacent to the center tap of a transversal automatic equalizer. The equalizer is used to provide first order correction of any intercept distortion present in the basband signal resulting from an error in the phase of the demodulating, i.e., recovered, carrier. This equalization is manifested in a differential adjustment of the controls for the two taps adjacent to the center tap. Information derived from the settings of the adjustable controls for these taps corresponding to this equalization is used to adjust the phase of the recovered carrier. Further, as mentioned above, because the phase can be set to eliminate intercept distortion produced by line distortion as well as carrier phase error, this mode of phase correction can also reduce the amount of distortion to be handled by the automatic equalizer.

The third phase correction approach involves the use of fullwave rectification of the line signal to produce a double carrier frequency component. The carrier is also fullwave rectified, using identical hardware to provide natural tracking, to similarly produce a double frequency component. The double frequency signals are phase compared to produce advance-retard information for phase correction of the recovered carrier.

As was stated hereinabove, a very important feature of the invention is the jitter immunity provided thereby. Degradation of the demodulated baseband signal due to phase jitter is avoided by causing the coherent carrier to exactly track the phase jitter. By utilizing a low pass or bandpass filter in the main signal path to remove the tone prior to demodulation and a delay equalizer to add sufficient delay to the signal path to insure time synchronization with the recovered carrier phase jitter, the delay paths to the detector modulator are made equal for the line carrier and the recovered carrier and hence two carrier components are made to vary in phase in absolute synchronization. As is discussed in more detail hereinbelow this "relative" real time tracking property of the carrier recovery system of the invention provides the desired jitter immunity.

Other features and advantages of the present invention will be set forth in or apparent from the detailed description of a preferred embodiment found hereinbelow.

DESCRIPTION OF THE PREFERRED EMBODIMENTS

Figure 1:
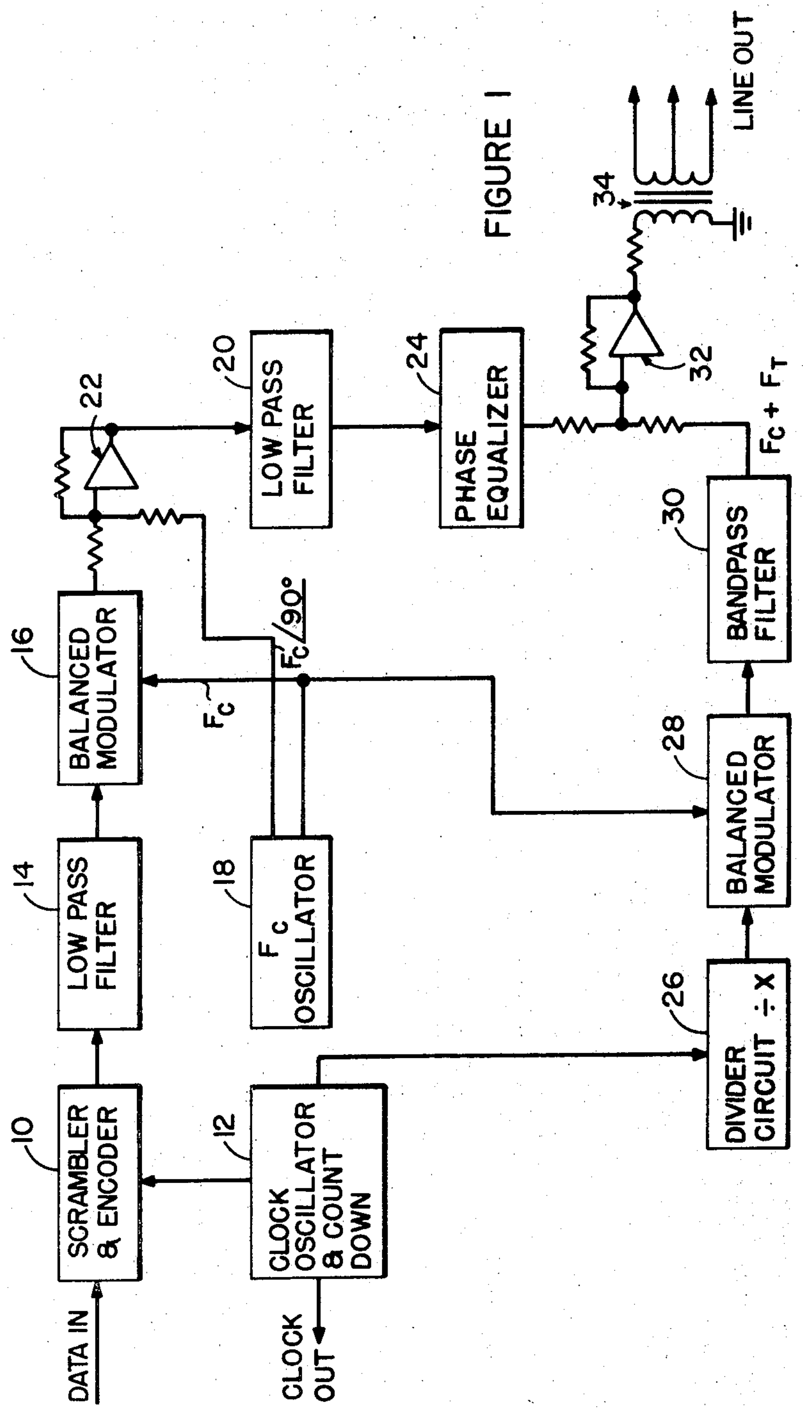
FIG. 1 is a schematic block circuit diagram of a typical vestigial sideband transmitter which has been modified in accordance with the present invention.

Referring to FIG. 1, a vestigial sideband transmitter suitable for use in accordance with the present invention is shown. As stated hereinabove, although a vestigial sideband system is shown, the present invention is applicable to further modulation techniques such as single sideband and double sideband, and the modulation can be bilevel or multilevel, biphase, multiphase or a combination thereof. The data input at the transmitter is applied to a first input of a scambler and encoder circuit 10, the second input of which is connected to a suitable clock oscillator and count down circuit 12. The data is sampled by clock 12 and scrambled prior to encoding, the encoding being as stated, either binary or multilevel. The output of encoder 10 is connected through a low pass filter 14 to a first input of a first modulator 16, filter 14 serving to bandlimit the analog signal for modulation by a carrier. The information-carrying output of filter 14 is modulated with a carrier frequency F produced by a carrier oscillator 18 connected to the second input to modulator 16. Modulator 16 is doubly balanced and produces a double sideband suppressed carrier signal which is processed through a low pass filter 20 to produce the vestigial sideband signal.

For the embodiment of the invention discussed hereinbelow with reference to FIG. 2, an operational amplifier 22 is used to add a quadrature component of carrier, that is, a signal of the same frequency as the carrier frequency F but in phase quadrature therewith, to the output of modulator 16. This very low level quadrature component of carrier can also be produced by adding a phase adjusted version of the output of carrier oscillator 18 to the output of low pass filter 20.

In the embodiment of FIG. 1, the amplitude and phase characteristics of the output of filter 20 are linearized in a conventional phase equalizer 24 to produce a near linear phase bandlimited line signal.

The output of clock 12 is divided in a divider circuit 26 by a factor $X$ to produce a clock submultiple frequency signal $F_T$. A modulator 28 is connected to the output of divider 26 and to carrier oscillator 18 and clock submultiple frequency $F_T$ is modulated therein with carrier frequency $F_C$. A bandpass filter 30 passes the higher frequency component $F_C + F_T$ to an operational amplifier 32 wherein this signal is added to the output signal of phase equalizer 24. The resultant output signal is connected to the primary of a transformer 34 the secondary of which is connected to the line.

Figure 2:
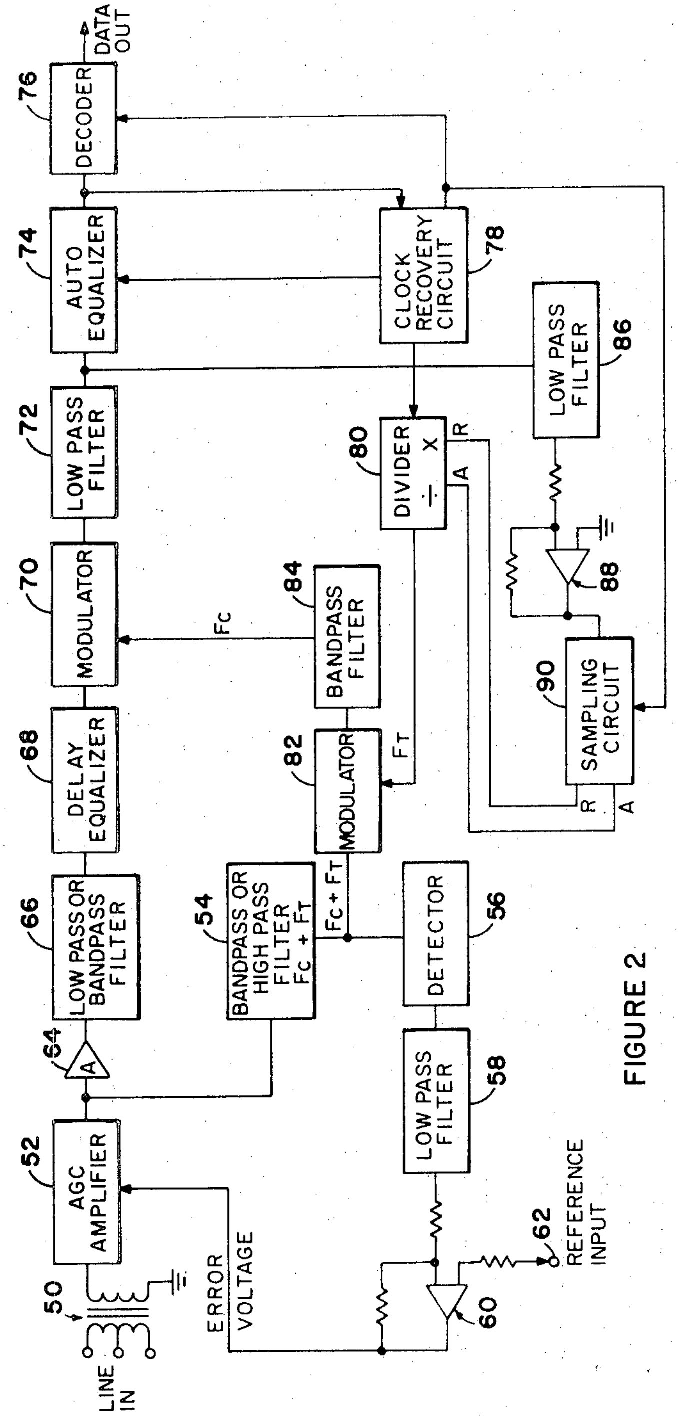
FIG. 2 is a schematic block circuit diagram of a first embodiment of a vestigial sideband receiver which is adapted to receive the output of the transmitter of FIG. 1 and which has been correspondingly modified in accordance with the present invention.

Referring to FIG. 2, a suitable vestigial sideband receiver is shown. Automatic gain control is accomplished by comparing the detected level of the auxillary tone with a reference to generate an error signal. Hence, as shown in FIG. 2, the output of the line transformer 50 is connected to a variable AGC amplifier 52 the output of which is connected through a high pass or band pass filter 54 to a detector 56. Filter 54 passes the tone frequency $F_C + F_T$ and the output of detector 56 is connected through a low pass filter 56 to one input of differential amplifier 60. The other input of amplifier 60 is connected to a reference signal applied to reference input terminal 62 and the error signal produced by differential amplifier 60 is used to control the gain of AGC amplifier 52.

The AGC amplifier is also connected through a further amplifier 64 to a low pass or band pass filter 66 which filters the line spectrum to remove the tone prior to modulation. The output of filter 66 is connected through a delay equalizer 68 to one input of a modulator 70. Demodulation of the output signal of equalizer 64 is accomplished by multiplying this signal in modulator 70 by the recovered carrier to translate the spectrum back to the baseband. The output of modulator 70 is connected to a low pass filter 72 which removes higher order components resulting from the demodulation process. Filter 72 is connected through an automatic equalizer circuit 74 to a decoding circuit or decoder 76.

Carrier frequency acquistion is accomplished by reversing the process of tone placement used in the transmitter of FIG. 1. The output of a clock recovery circuit 78 connected to the output of equalizer circuit 74 is divided in a divider circuit 80 by the factor $X$ to produce a clock submultiple frequency $F_T$ which is applied to one input of a further modulator 82. The second input is provided by the $F_C + F_T$ output of bandpass or high pass filter 54 and the output of modulator 82 is passed through a bandpass filter 84. The output of filter 84 which is, as indicated, the recovered carrier frequency $F_C$, is used, as stated hereinabove, to modulate the toneless delay equalized line spectrum appearing at the output of equalizer 68. With this arrangement the carrier frequency is correct when the clock frequency is recovered. The clock recovery circuit is preferably of the type disclosed in my copending application Ser. No. 172,089 filed concurrently herewith and entitled "Clock Recovery System," although conventional clock recovery systems can also be used.

To provide an aid in understanding the phase correction methods described herein below, it is thought helpful to calculate the signal spectrum at various points in the system. To this end, left $f(t)$ represent the baseband data signal applied to the transmitter modulator 16 and $F(w)$ represent the Fourier transform of this signal, and assume that it is bandlimited to less than $\omega_c$ radians per second, where $\omega_c = 2\pi F_c$ and $F_c$ is the carrier frequency. The ideal output of the modulator is $g(t) = f(t) 2\cos\omega_c t$ which has the Fourier transform $G(\omega) = F(\omega + \omega_c) + F(\omega - \omega_c)$.

This signal is filtered by VSB filter 20 which ideally has the transfer function $A(\omega) = 1$ for $|\omega| < \omega_c$ and $A(\omega) = 0$ elsewhere.

The output of VSB filter 20 is given by $$H(\omega) = G(\omega)A(\omega) \text{ or}$$

$$h(t) = f(t)\cos\omega_c t + \hat{f}(t)\sin\omega_c t$$

where $f(t)$ is the Hilbert transform of $f(t)$. This in the frequency domain corresponds to $$\hat{F}(\omega) = -j\,\mathrm{sign}(\omega)F(\omega) \text{ where}$$

$$sign(\omega) = \begin{cases} 1 & \omega > 0 \\ 0 & \omega = 0 \\ -1 & \omega < 0 \end{cases}$$

The signal $h(t)$ is then applied to the telephone line which has a transfer function $C(\omega)$. Thus, neglecting noise and added tones, the received signal $R(\omega)$ is represented by the formula $$R(\omega) = H(\omega)C(\omega)$$

As discussed hereinabove, the received signal is multiplied by $\cos(\omega_c tt\theta)$ where $\theta$ is the carrier phase offset at the receiver and passed through a low pass filter. Assuming an ideal low pass filter, the resulting baseband output is $$S = F(\omega)[C(\omega+\omega_c)U(-\omega) + C(\omega-\omega_c)U(\omega)/2]\, e^{j\theta sign(\omega)}$$

where $$\mu(\omega) = \begin{cases} 1 = \text{for } \omega_c \geq \omega \geq 0 \\ 0 \quad \text{for } \omega < 0, \omega > \omega_c \end{cases}$$

Thus, from baseband input to baseband output the channel looks like the filter $$D(\omega) = [C(\omega+\omega_c)U(-\omega) + C(\omega-\omega_c)U(\omega)/2]\, e^{j\theta sign(\omega)}$$

Figure 3A:
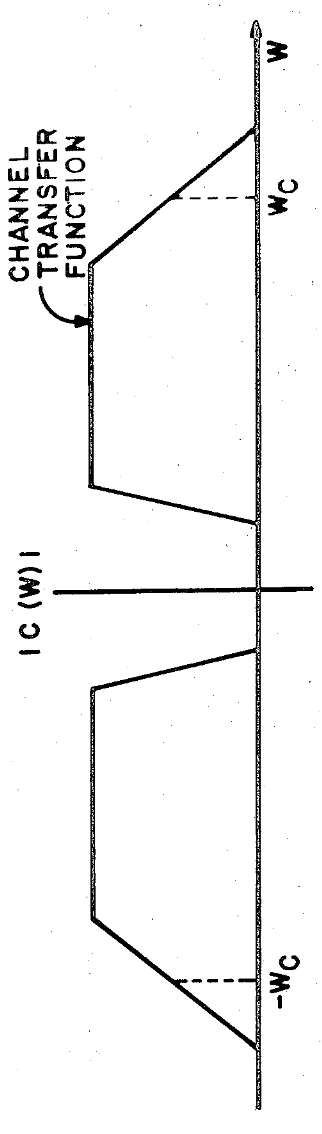
FIGS. 3*a* and 3*b* are graphical representations of the channel transfer function and equivalent baseband to baseband channel, respectively, used in explanation of the phase correction methods of the invention.
Figure 3B:
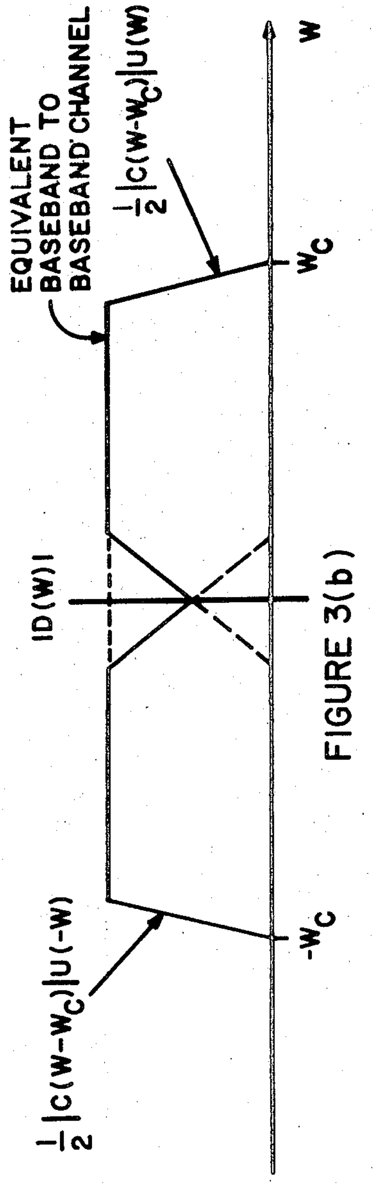

This is illustrated in FIG. 3*b*. It should be noted that the carrier phase offset $\theta$ appears as a phase shift of $\theta$ radians in the transfer function $D(\omega)$ and that the phase of $D(\omega)$ can have a discontinuity at $\omega = 0$. If $\phi_c(\omega)$ is the phase of $C(\omega)$ and $\phi_d(\omega)$ the phase of $D(\omega)$ then $$\phi_D(O^+) = \phi_c(-\omega_c) + \theta = -\phi_c(\omega_c) + \theta \text{ and}$$

$$\phi_d(O^-) = \phi_c(\omega_c) - \theta = -\phi_d(O+)$$

since for any phase function $\phi(-\omega) = -\phi(\omega)$. Thus the magnitude of the phase discontinuity at $\omega = O$ is $2|\phi_c(\omega_c) - \theta|$. This discontinuity is difficult to correct with a transversal equalizer but can easily be eliminated by setting $\theta = \phi_c(\omega_c)$. Three methods of carrier phase correction are described below.

FIG. 2 illustrates a first carrier phase correction embodiment. As mentioned hereinabove, for this embodiment use is made of the quadrature carrier component in the transmitted spectrum. If the carrier signal is $2\cos\omega_c t$, the quadrature tone is $\sin\omega_c t$ and the received quadrature tone $2|C(\omega_c|\sin[\omega_c t + \phi_c(\omega_c))]$. If this signal is corrected with $\cos(\omega_c t + \theta)$, *the correlation is proportional to* $\sin(\phi(\omega) - \theta$. *Thus when* $\theta = 0$ the correlation is zero. The correlator output is used to advance or retard the receiver carrier phase and drive the correlation to zero, as shown above, when $\theta = \phi(\omega)$ the phase discontinuity in $D(\omega)$ at $\omega = 0$ is eliminated. Stated differently, if the phase correlation is zero, when the quadrature carrier frequency signal is multiplied by the real or covered carrier the multiplier output must also be zero. Hence, the magnitude and polarity of the output produced by this multiplication process is indicative of the amount and direction of the phase error. Referring to FIG. 2, the quadrature carrier signal contained in the line spectrum is multiplied by the recovered carrier in product modulator 70 and the output of low pass filter 72 is connected through a further low pass filter 86 and a differential amplifier 88 to a sampling or gating circuit 90. The sampling rate of sampling circuit 90 is controlled by clock recovery circuit 78, one output of clock recovery circuit 78 being connected to the control terminal of sampling circuit 90 as shown. Depending on the output of amplifier 88, sampling circuit 90 produces an appropriate retard or advance signal, at corresponding terminal "R" or "A", which is applied to the retard or advance input terminals of divider 80.

Because the output of divider 80 is used in deriving the recovered carrier as described hereinabove the phase of the recovered carrier can be advanced or retarded as necessary to drive the correlation between itself and the real carrier to zero.

As stated hereinabove, an important feature of the system of the invention is jitter immunity provided thereby. This jitter immunity is provided in the system of FIG. 2, as well as in further embodiments described hereinbelow, by the "relative" real time tracking property of the carrier recovery and demodulation process. To explain, it is noted that phase jitter encountered in the telephone system is manifested in a common angle variation of all components in the spectrum of interest. When coherent or synchronous detection, as described hereinabove, is employed, this angle variation appears in the demodulated baseband as both a "time jitter" in the signal and a time varying delay distortion. In order to avoid this, the coherent or recovered carrier is made to exactly track the phase jitter. Hence, the relative variation of the recovered carrier and the carrier in the line signal is reduced to zero and thus the phase jitter is not present in the detected baseband signal. It should be noted that it is not sufficient that the two carrier components, i.e., the line carrier and the recovered carrier, vary in phase in a like manner. These components must be in absolute time synchronization, that is, the phase delays to the detector modulator 70 must be equal. To accomplish this, the low pass or bandpass filter 66 in the main signal path is used to remove the tone prior to demodulation in modulator 70 and the delay equalizer 68 is used to add sufficient delay to the signal path to insure time synchronization with the carrier phase jitter.

Figure 4:
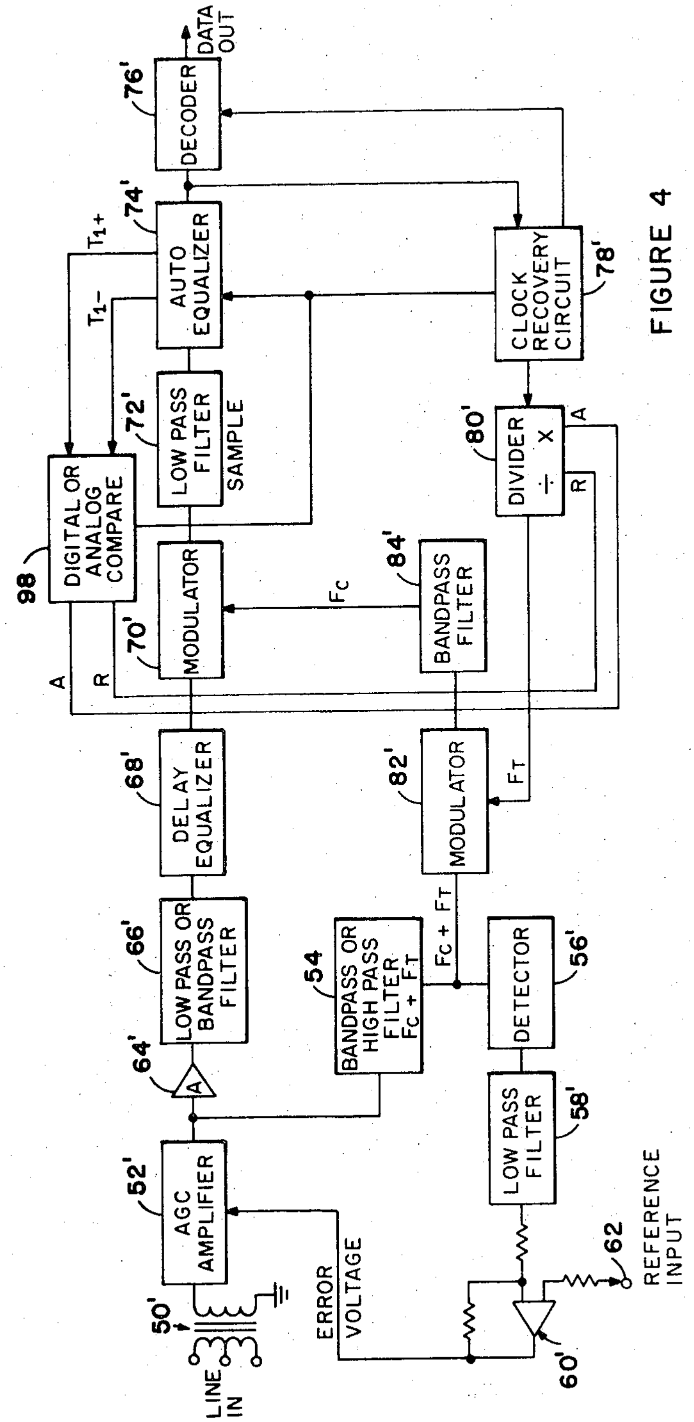
FIG. 4 is a schematic block circuit diagram of a second embodiment of the receiver of FIG. 2.

Referring to FIG. 4, a second embodiment of the receiver of the invention is shown. The receiver of FIG. 4 is similar to that of FIG. 2 apart from the type of carrier phase correction provided thereby, and like elements in FIG. 4 have been identified by the same numerals with primes attached. In the embodiment of FIG. 4, use is made of the information contained for the taps adjacent to the center tap in an automatic transversal filter equalizer 74'. Transversal filter equalization is described in the text *Data Transmission*, by Bennett and Davey, McGraw-Hill, at pages 269 to 273 and reference is made to that text for a further general description of this form of equalization. Further, in addition to the following generalized consideration of this aspect of the invention made with reference to FIG. 4, the specific embodiment of FIG. 5 will be considered hereinbelow. Referring to FIG. 4, first order correction of any intercept distortion in the baseband signal resulting from an error in the phase of the recovered, demodulated carrier signal at the output of bandpass filter 84' is corrected by equalizer 74'. This equalization is provided by a differential magnitude adjustment of the controls for the two taps, denoted $T_{1-}$ and $T_{1+}$, of the transversal filter 74' adjacent to the center tap. In accordance with this embodiment of the invention, the information contained in the settings of the adjustable controls for taps $T_{1-}$ and $T_{1+}$ is used to adjust the recovered carrier phase. These outputs are fed to a digital or analog comparison circuit 98, described in more detail hereinbelow with reference to FIG. 5, wherein, in accordance with the type of equalization provided by equalizer 74', an advance or retard signal is produced at terminals A or R as appropriate. As before, the advance and retard signals are used to control the output of divider 80' and hence the phase of the recovered carrier. Output of comparison circuit 92 is also fed back to an input to equalizer 74' as shown.

It should be noted this carrier phase correction approach used in the embodiment of FIG. 4 permits the phase to be set so as to remove intercept distortion whether this distortion is a result of carrier phase error or line distortion. Hence, in some instances, this mode of correction reduces the amount of distortion to be handled by the automatic equalizer 74''.

Figure 5:
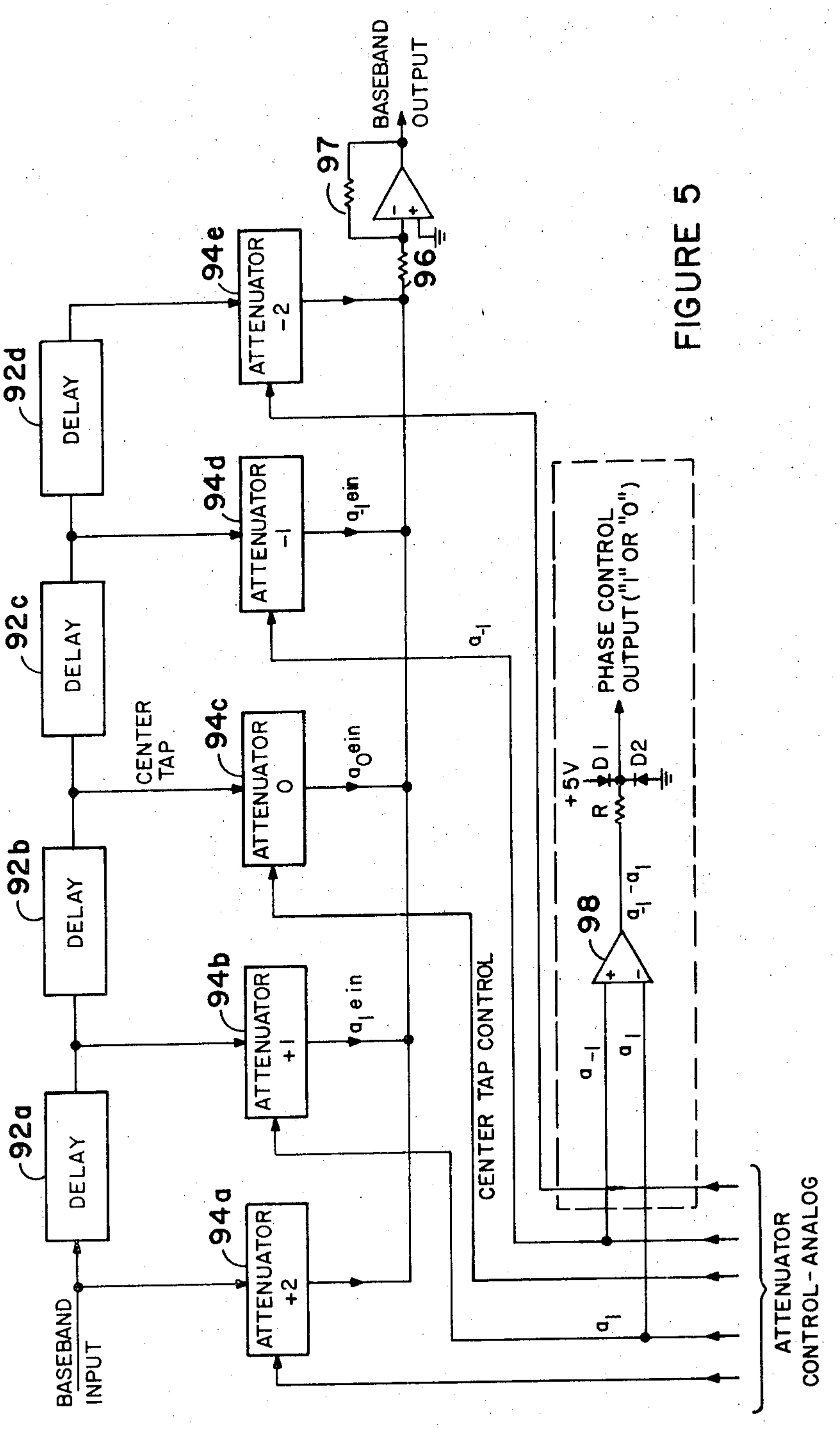
FIG. 5 is a schematic circuit diagram of the automatic transversal equalizer of FIG. 4.

Referring to FIG. 5, the transversal automatic equalizer of the embodiment of FIG. 4 will be considered in more detail. The transversal automatic equalizer of FIG. 5 is denoted 92 and corresponds to equalizer 74 of FIG. 4. The equalizer 92 is formed by a five tap delay line made up of four equal delay sections 92*a*, 92*b*, 92*c* and 92*d* as shown, the taps being connected through corresponding voltage controlled attenuators 94*a*, 94*b*, 94*c*, 94*d* and 94*e* to a common output line 96. The baseband input is connected to input of equalizer 92 and the outputs of attenuators 94*a*, 94*b*, 94*c*, 94*d* and 94*e* are processed by an operational amplifier 97 to produce a baseband output. Control voltages, corresponding to voltages $a_1$ and $a_{-1}$ discussed hereinbelow, are applied to the inputs of attenuators 94*a*, 94*b*, 94*c*, 94*d*, and 94*e* provide equalization of the input baseband signal.

As stated hereinabove, the information contained in the controls for the taps adjacent to the center tap is to be made use of. As shown in FIG. 5, control voltages $a_1$ and $a_{-1}$ are applied to voltage controlled attenuators 94*b* and 94*d*. These voltages are analog signals in the form of slowly varying DC voltages (+ or −). Considering the center tap and the two adjacent taps, a three tap equalizer has the transfer function $H(\omega) = a_{-1}e^{j\omega T} + a_0 + a_1 e^{j\omega T}$ where $a_0$ is the control voltage for center tap attenuator 94*c*, $a_{-1}$ and $a_1$, as stated, are the control voltages for the attenuators 94*b* and 94*d* adjacent the center tap, and $T$ is the delay between taps. The transfer function $H$ $(W)$ can be written as $$H\ (W) = A_0 + (a_1 a + a_{-1})\cos(\omega T) - j(a_1 - a_{-1})\sin(\omega T)$$

The phase of the transfer function $H(w)$ is determined by the equation $$\phi(\omega) = [(a_{-1} - a_1)\sin\omega T]/[a_0 + (a_1 + a_{-1})\cos\,\omega T]$$

For most channels $a_0 + a_1 + a_{-1} > 0$, so that for near zero the sign of the equalizer phase correction is $$\text{sign}\ \phi = \text{sign}\ (a_{-1} - a_1)$$

Thus, the sign of the carrier phase error is given by the difference between the $a_{-1}$ and $a_1$ control voltages. As shown in FIG. 5, the $a_{-1}$ control signal is also applied to the plus, non-inverting input of an operational amplifier 98, corresponding to the comparison circuit of the same number in FIG. 4, whereas the $a_1$ control signal is applied to the negative, inverting input. Operational amplifier 98 is preferably a high gain (60*db* being typical) integrated circuit operational amplifier, although a further discrete transistor amplifier could be used in addition. With these inputs, the output of operational amplifier 98 is $+a_{-1} - a_1$. This output can be a positive or negative voltage and a resistor R and a pair of diodes D1 and D2 are used to limit the voltage swing between typical limit values of −0.6 volts and +4.4 volts so as to be compatible with *TTL* and *DTL* logic circuits. The phase control output is thus digital with a 1 indicating that the $a_{-1}$ voltage is greater than the $a_1$ voltage and a 0 output indicating that the $a_{-1}$ voltage is less than $a_1$ voltage. As discussed hereinabove, with a 1 at the phase control output, the phase of divider 80' of FIG. 4 will be advanced and this advance will continue until the output is a 0. With the proper carrier phase the output will alternate between a one and a zero with the number of zeroes equal to the number of ones. The phase output is preferably applied to a counter circuit, or circuits, (not shown) which acts as an integrator, whereby the counter does not produce an output until, for example, the number of ones exceeds the number of zeroes by the capacity of the counter.

In alternative embodiment, the voltage control signal of FIG. 5 can be a digital signal and a digital comparator substituted for operation amplifier 96. The operation is otherwise the same.

Figure 6:
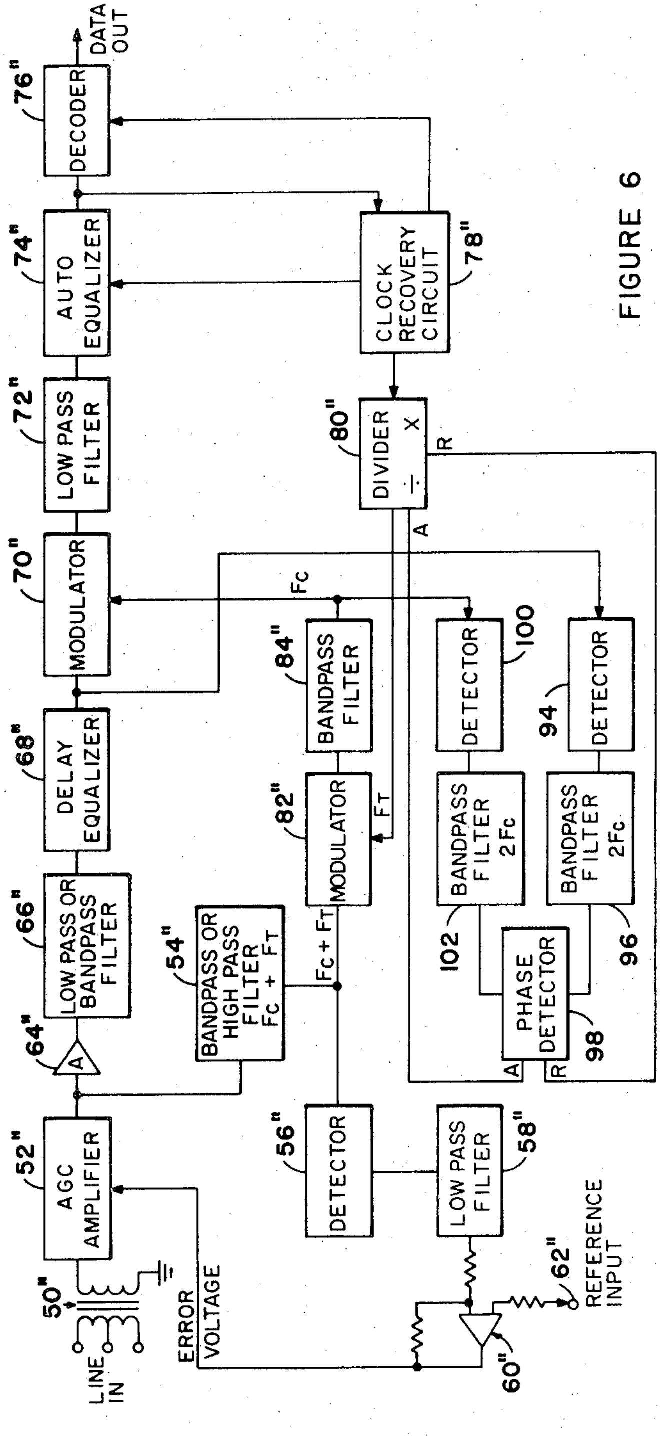
FIG. 6 is a schematic block circuit diagram of a third embodiment of the receiver of FIG. 2.

Referring to FIG. 6, a third embodiment of the receiver of the invention is shown. The embodiment of FIG. 4 is also similar to that of FIG. 2 and like elements have been given the same numerals with double primes attached. Again, the embodiment of FIG. 6 differs from that of FIG. 2, as well as from that of FIG. 4, in the type of carrier phase correction provided. In the embodiment of FIG. 6 use is made of the fullwave rectification of line signal to produce a $2F_C$ component. Reference is again made to the Bennett and Davey text referred to above, at pages 140 to 141, for a discussion of fullwave rectifier carrier detection. Referring to FIG. 6, the output of delay equalizer 68'' is connected through a detector 94, in the form of a fullwave linear rectifier, and a bandpass filter 97 designed to pass the frequency $2F_c$, to a first input of a phase detector 98. Similarly, the output of bandpass filter 84'', i.e., the recovered carrier $F_C$, is connected through a further detector 100 and a further bandpass filter 102 to a second input of detector 98. Detector 100 and filter 102 are identical to detector 94 and filter 96 and hence natural tracking of the recovered carrier provided by the identical hardware will produce a $2F_C$ component which can be compared to that of the line-derived $2F_C$ component. The phase comparison performed by phase detector 98 is used to produce advance-retard information for correction of the recovered carrier and hence advance and retard terminals A and R are connected to corresponding terminals of divider 80''.

Although the invention has been described with reference to particular exemplary embodiments thereof, those skilled in the art will understand that variations and modifications in these embodiments may be effected without departing from the scope and spirit of the invention.

I claim:

1. A data communication system comprising transmitter means including clock oscillator means for sampling a data input signal at a predetermined clock frequency to produce a baseband information spectrum, first modulator means for modulating said information spectrum with a carrier to produce a carrier modulated information spectrum, means for deriving a frequency which is a sub-multiple of said clock frequency, second modulator means for modulating said clock sub-multiple frequency with said carrier to produce a tone of a frequency outside of said carrier modulated information spectrum and means for adding said carrier modulated information spectrum and said tone to produce a composite transmit spectrum, and receiver means comprising means for receiving said composite signal, first filter means for filtering the received composite signal to produce a recovered carrier modulated information spectrum, second filter means for filtering the received composite signal to produce a recovered tone, first demodulator means connected to the output of said first filter means, clock recovery means connected to the output of said first demodulator means for recovering said clock frequency, dividing means for dividing the recovered clock frequency by said sub-multiple to produce a recovered clock sub-multiple frequency, second demodulator means for modulating the recovered tone with said clock sub-multiple frequency to produce a recovered carrier, said first demodulator means modulating the recovered carrier modulated information spectrum with said recovered carrier to produce a recovered baseband information spectrum, and means located in the input path to said first demodulator means which contains said first filter means for equalizing the delays in the paths of said carrier modulated information spectrum and said recovered carrier to said first demodulator means.

2. A data communication system as claimed in claim 1 further comprising means for correcting the phase of said recovered carrier relative to the phase of the carrier of the carrier modulated information spectrum, the output of said phase correcting means being connected to said dividing means to control the output thereof.

3. A data communication system as claimed in claim 2 wherein said transmitter means further comprises means for generating a quadrature component of said carrier and for adding said component to said composite spectrum and wherein said carrier phase correcting means comprises product modulator means for modulating the received composite signal with the recovered carrier to produce an error signal.

4. A data communication system as claimed in claim 3 wherein said second demodulator means is formed by said product modulator means, said receiver means further including means for connecting said error signal to said dividing means for controlling advancement and retardation of the output thereof.

5. A data communication system as claimed in claim 2 wherein said carrier phase correcting means comprises automatic transversal filter equalizer means connected to the output of said second demodulator means and having first and second adjustable taps, and means for converting the information contained in the settings of said first and second taps at equalization into a control signal and means for connecting the output of said converting means to said dividing means to control advancement and retardation of the output thereof.

6. A data communication system as claimed in claim 2 wherein said phase correcting means comprises means for comparing the phase of the carrier component of the recovered carrier modulated information spectrum with the phase of the recovered carrier and for deriving an error signal in accordance with the comparison.

7. A data communication system as claimed in claim 6 wherein said comparing means comprises a first detector having an input to which is applied the received carrier modulated information spectrum, a second detector to which is applied the recovered carrier, first and second bandpass filters connected to the outputs of said first and second detectors, respectively, for passing twice the carrier frequency, phase detector means for comparing the phase of the outputs of said first and second bandpass filters and means for connecting the output of said phase detector to an input to said dividing means to control advancement and retardation of the output of said dividing means.

8. A data communication system as claimed in claim 7 wherein said delay equalization means comprises a delay equalizer connected between said first filtering means and said first demodulator means.

9. A data communication system comprising transmitter means including clock oscillator means for sampling a data input signal at a predetermined clock frequency to produce a baseband information spectrum, means for modulating said information spectrum with a carrier to produce a carrier modulated information spectrum, means for modulating a signal having a frequency which is a sub-multiple of said clock frequency with said carrier to produce a single tone having a frequency outside of said carrier modulated information spectrum, means for adding said carrier modulated information spectrum and said tone to produce a composite transmit spectrum comprising said single tone and said carrier modulated information spectrum, and receiver means comprising means for receiving said composite spectrum, means for recovering said tone from the received composite spectrum, clock recovery means for recovering said clock frequency from the received composite spectrum, divider means connected to the output of said clock recovery means for dividing said recovered clock frequency by said sub-multiple to produce a recovered clock sub-multiple frequency, first demodulator means for modulating said recovered tone by said recovered clock sub-multiple frequency to produce a recovered carrier frequency, means for deriving a recovered carrier modulated information spectrum from said composite spectrum, and further demodulator means, having a first input connected to the output of said means for deriving said recovered carrier modulated information spectrum and a second input connected to the output of said first modulator means, for modulating said recovered carrier modulated information spectrum with said carrier to produce a recovered baseband information spectrum, said receiver means further comprising delay equalizer means connected in series with said first input of said further demodulator means for equalizing the delays in the paths of said recovered carrier modulated information spectrum and said recovered carrier so as to provide phase jitter tracking of the recovered carrier and the carrier in the recovered carrier modulated information spectrum.

10. A data communication system comprising transmitter means comprising means for generating an information spectrum, means for modulating said information spectrum with a carrier to produce a carrier modulated information spectrum, means for deriving a quadature component of said carrier, and means for adding said quadature component to said carrier modulated information spectrum to produce a composite transmit spectrum, and receiver means including means for receiving said composite spectrum, means for recovering said carrier from the received composite spectrum, means for deriving a recovered carrier modulated information spectrum from the received composite spectrum, and phase correcting means for correcting the phase of said recovered carrier relative to the phase of the carrier of said carrier modulated information spectrum, said phase correcting means comprising product modulator means for modulating the quadrature carrier in the received composite spectrum with the recovered carrier to produce an error signal, and means for controlling the phase of the recovered carrier in accordance with said error signal, said information spectrum generating means comprising clock generator means for sampling a data input signal at a selected clock frequency to produce said information spectrum, said transmitter means further comprising means for modulating a signal having a frequency which is a sub-multiple of said clock frequency with said carrier to produce a tone having a frequency outside of said carrier modulated information spectrum and means for adding said tone to said carrier modulated information spectrum and said quadrature carrier, said receiver means including filtering means for filtering said composite spectrum to produce a recovered tone and said means for recovering said carrier comprising clock recovery means for recovering the clock frequency from said composite spectrum, and means for dividing the recovered clock frequency by said sub-multiple to produce a recovered clock sub-multiple frequency and first demodulator means for modulating said recovered tone with said recovered clock sub-multiple frequency to produce a recovered carrier, said receiver means further including second demodulator means for modulating a recovered carrier modulated information spectrum with said recovered carrier to produce a recovered information spectrum and said phase controlling means being connected to said dividing means for controlling the output thereof.

11. A data communication system comprising transmitter means comprising means for generating an information spectrum, means for modulating said information spectrum with a carrier to produce a carrier modulated information spectrum, means for deriving a quadrature component of said carrier, and means for adding said quadrature component to said carrier modulated information spectrum to produce a composite transmit spectrum, and receiver means including means for receiving said composite spectrum, means for recovering said carrier from the received composite spectrum, means for deriving a recovered carrier modulated information spectrum from the received carrier spectrum, and phase correcting means for correcting the phase of said recovered carrier relative to the phase of the carrier of said carrier modulated information spectrum, said phase correcting means comprising product modulator means for modulating the quadrature carrier in the received composite spectrum with the recovered carrier to produce an error signal, and means for controlling the phase of the recovered carrier in accordance with said error signal, said information spectrum generating means comprising clock generator means for sampling a data input at a selected clock frequency to produce said information spectrum, said transmitter means further comprising means for modulating a signal having a frequency which is a sub-multiple of said clock frequency with said carrier to produce a tone having a frequency outside of said carrier modulated information spectrum, and means for adding said tone to said carrier modulated information spectrum and said quadrature carrier, said receiver means including filtering means for filtering the composite transmit spectrum to produce said carrier modulated information spectrum and a recovered tone, clock recovery means for recovering said clock frequency, divider means for dividing the recovered clock frequency by said sub-multiple to produce a recovered clock sub-multiple frequency, first demodulator means for modulating said recovered tone with said recovered clock sub-multiple frequency to produce a recovered carrier, a second demodulator means for modulating said recovered carrier modulated information spectrum with said recovered carrier to produce a recovered information spectrum, and means connected in series with said second demodulator means for equalizing the delays in the paths of said carrier modulated information spectrum and said recovered carrier at the input of said second demodulator means so as to provide phase jitter tracking of the recovered carrier and the carrier in said carrier modulated information spectrum.

* * * * *